Dec. 24, 1963 G. W. HARRY 3,115,031
PRESSURE TESTING APPARATUS
Filed June 2, 1960

INVENTOR.
Gordon W. Harry
BY
George E. Johnson
ATTORNEY

United States Patent Office 3,115,031
Patented Dec. 24, 1963

3,115,031
PRESSURE TESTING APPARATUS
Gordon W. Harry, Flushing, Mich., assignor to General Motors Corporation, Detroit, Mich., a corporation of Delaware
Filed June 2, 1960, Ser. No. 33,517
3 Claims. (Cl. 73—40)

This invention relates to testing apparatus and more particularly to apparatus for testing devices such as automotive radiators and caps for the same for possible leakage.

Testing apparatus for use with radiators and caps is disclosed and exemplified in the United States application Serial No. 649,220, filed March 28, 1957, in the name of Jesse E. Eshbaugh, now United States Patent 2,981,095. Such apparatus has been found satisfactory but a need has arisen for a more simple and inexpensive apparatus which is easier to use and also is rugged in service. Modern automotive radiators are pressurized to increase their effectiveness and to minimize losses in engine coolant. A cap in the filler neck of such a radiator and capable of retaining the pressure is disclosed in the United States Patent 2,582,209, granted January 8, 1952, in the names of L. Smith and D. Friend. Caps of this type take many specific forms but, in general, they are made to fit either of two sizes of filler necks forming parts of modern automotive radiators. The two sizes of filler necks are generally of the same diameter, but their depths as measured from their open ends to inner annular seats with which they are provided, are either 3/4 of an inch and herein termed "short" necks, or one inch and herein termed "long" necks. A given piece of testing apparatus obviously should be conveniently adjustable selectively to fit either short or long filler necks.

An object of the present invention is to provide an improved testing apparatus which is selectively adjustable and by means of which devices such as automotive radiators having two sizes of filler necks may conveniently be tested for possible leakage.

To this end, a feature of the present invention is an air supply chamber to which a pump and a pressure gage are connected, the chamber also having cam means for releasably and rotatably attaching it to a filler neck and axially adjustable sealing means being provided for establishing an airtight connection between said pump or gage and an inner annular seat in the filler neck whether the latter be short or long.

These and other important features of the invention will now be described in detail in the specification and then pointed out more particularly in the appended claims.

Figures 1, 2, 3:
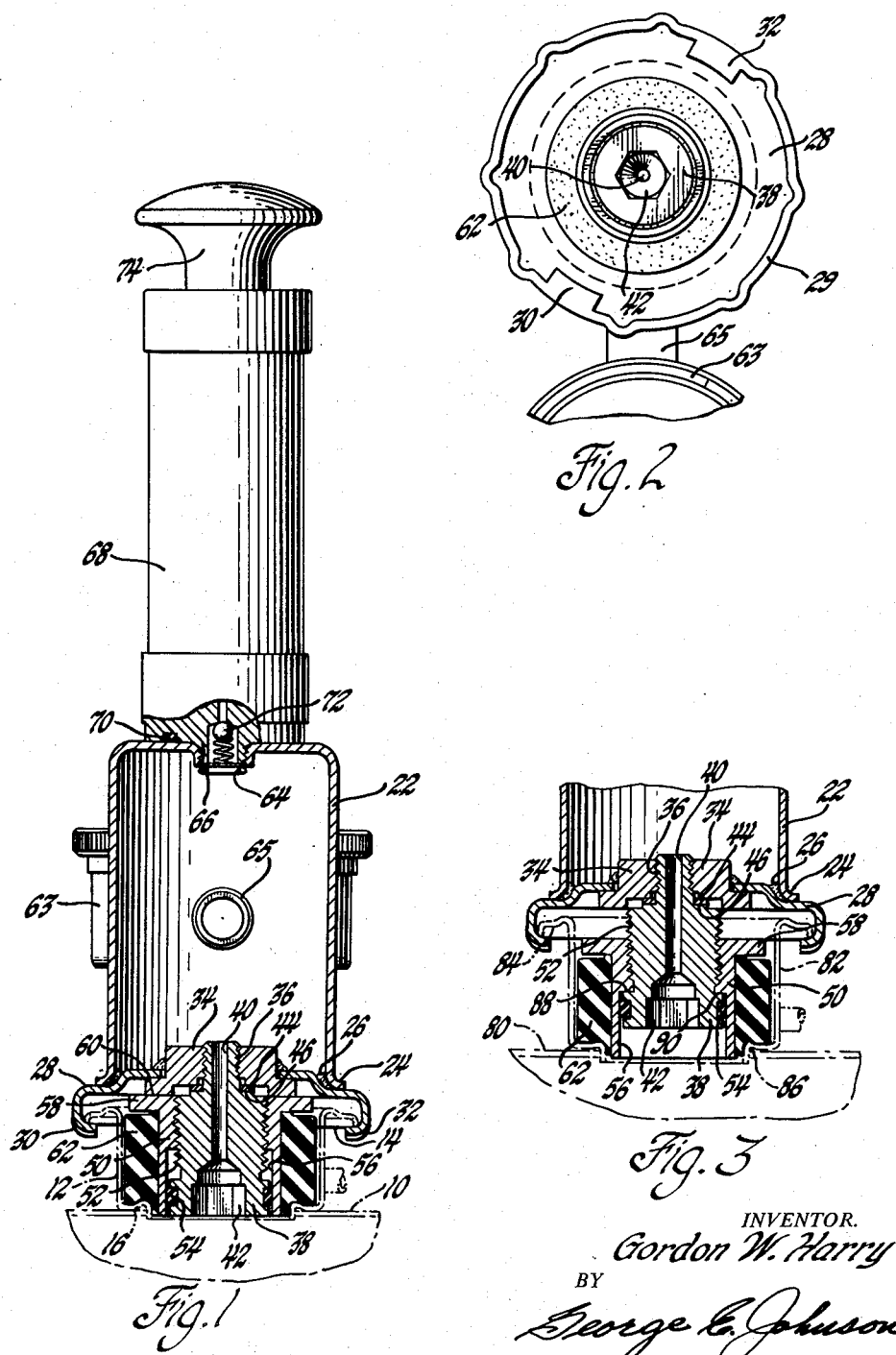
FIGURE 1 is an elevation view, partly in section, of testing apparatus embodying the present invention, the apparatus being shown as positioned on a short filler neck of a radiator.
FIGURE 2 is a bottom view of the apparatus shown in FIGURE 1.
FIGURE 3 is a sectional view of a portion of the apparatus shown in FIGURE 1 but with that apparatus as adjusted for and positioned on a long filler neck.

In FIGURE 1, a portion of a radiator 10 and a short filler neck 12 are shown in dot-and-dash lines. The neck 12 includes a conventional top outwardly flared cam flange 14 having diagonally opposed notches which are not shown in the drawing. The filler neck 12 also is provided with an inner annular 16 through which communication is had with the radiator 10. The distance between the flange 14 and the annular seat 16 is in the order of 3/4 of an inch and is termed a "short" neck as heretofore set forth.

An air supply chamber, which is cylindrical in shape to afford a handhold, is in the form of an inverted cup 22 having an annular out-turned margin 24 welded as at 26 to a disk 28 forming part of a cam means for attaching the testing apparatus to a filler neck. The disk 28 bears a marginal wall 29 and two inwardly turned prongs 30 and 32. These prongs are diagonally opposed and adapted to enter the notches in the flange 14 and then, upon clockwise rotation of the cylindrical air chamber 22, to cooperate with the flange 14 and, by cam action, force the testing apparatus a slight distance downwardly toward the radiator 10 to form a tight connection. A nut 34 is welded to the disk 28 and is provided with a threaded opening 36 for the reception of a reduced end portion of a threaded bolt 38. The latter is provided with an axial passage 40 giving communication between the chamber 22 and the radiator 10. This passage 40 is enlarged at its lower end to form a hexagonal recess 42 permitting the insertion of a wrench for tightly joining the bolt 38 to the nut 36. A sealing washer 44 is interposed between the nut 34 and a shoulder 46 formed on the bolt.

A sleeve 50 is interiorly threaded to engage the left-hand screw threads 52 on an intermediate portion of the bolt 38. The lower end of the bolt 38 is enlarged to form a groove between annular shoulders for the retention of an O-ring 54. This ring maintains an airtight seal between the bolt 38 and the inner smooth cylindrical wall 56 of a recess formed in the lower half of the sleeve 50. The upper end of the latter bears an outwardly extending annular flange 58 which is adapted in one selected operational positioning of the parts to engage a bottom surface 60 of the nut 34 as in FIGURE 1.

A distortionable rubber annulus 62 tightly surrounds the sleeve 50 and when the device is in operative position for testing a radiator 10 with the short neck 12, the annulus extends from the flange 58 downwardly into sealing engagement with the annulus seat 16 with the flange 58 firmly contected by the surface 60 as will further appear.

A conventional pressure gage 63 is connected to chamber 22 as at 65 so that an operator can read the gage dial and determine the pressure of air within the chamber 22 and within the radiator 10. The upper end of the chamber 22 has a threaded aperture 64 for receiving the threaded discharge end 66 of a plunger type air pump 68. A seal between the pump body and the chamber 22 is maintained by a gasket 70. A spring pressed ball check valve 72 is arranged in the lower part of the pump 68 so that pressure may be retained within the chamber 22. The plunger of the pump 68 may be manually reciprocated by a knob 74.

In utilizing the testing apparatus as shown in FIGURE 1, that is on a "short" neck, the apparatus including the pump 68, the chamber 22 and the disk 28 is so placed on the radiator neck that the distortionable annulus 62 will freely enter the filler neck 12, the relative positions of the sleeve 50 and the nut 34 being adjusted or selected to be as indicated. By virtue of the prongs 30 and 32, the nut 34 and the annulus 62 are caused to be cammed downwardly by rotation of the testing apparatus and the cam action pushes the rubber annulus 62 into sealing relation with the seat 16. With the parts thus positioned, the operator may generate the required air pressure in the radiator by actuating the plunger knob 74. The test pressure is quickly obtained and after it is obtained as indicated by the gage 63, it may be quickly seen from the gage reading whether or not a leak exists in the radiator by the pressure dissipating or being retained.

When the testing is completed, the air pressure in the radiator may be reduced by turning the testing apparatus with relation to the filler neck 12. The apparatus is not turned sufficiently to release it from the filler neck completely but merely to loosen it sufficiently to permit air pressure to escape after which the apparatus may be turned further completely to disengage the prongs 30 and 32 from the flange 14.

In the use as depicted in FIGURE 3, a radiator 80 with a long filler neck 82 is depicted in dot-and-dash lines. This neck bears an outer flange 84 capable of giving cam action as in the case of the flange 14 in FIGURE 1. The neck 82 also has an inner annular seat 86 upon which the rubber annulus 62 is adapted to seat. As the neck 82 is a long filler neck, the distance between the seat 86 and the flange 84 is greater than the distance between the seat 16 and the flange 14 of FIGURE 1. As a consequence, the insertion of the annulus 62 and joinder of the chamber 22 to the radiator neck must follow a preliminary axial adjustment of the sleeve 50 and annulus 12 with respect to the bolt 38. This is accomplished by turning the sleeve 50 on the threads of the bolt. The relative positions of the sleeve and the bolt are preselected so that a shoulder 88 on the bolt will engage a shoulder 90 on the sleeve. This institutes a stop and determines the proper distance of the annulus from the disk 28 to give an adequate seal at the seat 86 when the testing apparatus is cammed down into position on the filler neck.

It will be appreciated that the testing apparatus may be used to test radiator caps using a suitable adapter simulating a filler neck at each end for receiving the apparatus at one end and the particular pressure cap at the other.

There are two predetermined adjustments which may conveniently be carried out and with definiteness and accuracy. The adjustment for a "short" neck is determined by the positive engagement of the two surfaces 58 and 60 as stops. The two surfaces of the two shoulders 88 and 90 likewise serve as stops for "long" necks. There is no positively determined intermediate position. The threads 52 are left-handed in order that the adjustment for filler neck size will not be disturbed in turning the testing apparatus clockwise into operative position.

I claim:

1. Testing apparatus comprising a chamber affording a handhold, an air pump and a pressure gage connected to said chamber, cam means permanently attached to said chamber for rotatively attaching the apparatus to a short or long radiator neck having an inner annular seat, sealing means surrounded by said cam means and including axially and relatively adjustable parts attached to said chamber, stop surfaces within said sealing means, determining the range of adjustments of said parts, one of said parts defining a discharge passage for said chamber, through said cam means and another of said parts being adapted to enter said neck and positively engage said seat when said cam means performs its function and some of said stop surfaces are in contact as determined by said adjustment 2. Testing apparatus comprising cam-operated means for clockwise rotational attachment of said apparatus to the flanged open end of a radiator filler neck having an annular inner seat therein, a cup, an air pump and a pressure gage connected through said cup to said cam-operated means, sealing means including a bolt conduit with one end fixed to said apparatus and extending through said cam-operated means into said cup, a sleeve attached to said bolt by means of left-handed threads for axial adjustment to a predetermined position therein, a distortionable annulus movable with said sleeve and having an outer diameter less than the inner diameter of said filler neck, the attachment of said apparatus to said filler neck by said cam-operated means serving to press said annulus to said inner seat with said predetermined position attained, and said cup, pump and pressure gage forming an integrated rigid structure facilitating the said rotational attachment.

3. Apparatus for testing automotive radiators, said apparatus comprising means for rotative optional attachment to the open end of a radiator filler neck of the short and long types having an annular inner seat therein, said means including a cup, an air pump and a pressure gage connected through said cup to said attachment means, sealing means including a bolt with one end concealed by said cup and fixed to and extending through said attachment means, two sets of opposing surfaces within said sealing means, a sleeve axially adjustable by threaded means on said bolt to either of two preselected positions dependent upon said stop surfaces, a distortionable annulus movable with said sleeve, a passage leading through said bolt, and said annulus being adapted to engage said seat when the opposing surfaces of one of said sets are in contact.

References Cited in the file of this patent

UNITED STATES PATENTS

| | | |
|---|---|---|
| 1,761,396 | Karmazin | June 3, 1930 |
| 2,760,367 | Stromberg | Aug. 28, 1956 |
| 2,839,068 | Cassia | June 17, 1958 |
| 2,847,851 | Enell | Aug. 19, 1958 |
| 2,981,095 | Eshbaugh | Apr. 25, 1961 |
| 3,035,435 | Johnson | May 22, 1962 |